United States Patent
Dykstra et al.

(10) Patent No.: US 6,817,167 B2
(45) Date of Patent: Nov. 16, 2004

(54) FORAGE HARVESTER WITH TAPERED FEED TROUGH

(75) Inventors: Martin Dykstra, Jessen (DE); Carsten Wienecke, Anröchte (DE); Heinrich Isfort, Dülmen (DE); Markus Deppe, Bielefeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/307,602

(22) Filed: Dec. 2, 2002

(65) Prior Publication Data
US 2003/0101705 A1 Jun. 5, 2003

(30) Foreign Application Priority Data
Dec. 3, 2001 (DE) .......................... 101 58 953

(51) Int. Cl.[7] .............................................. A01D 43/00
(52) U.S. Cl. ........................................................ 56/153
(58) Field of Search ............................. 56/16.4 R, 16.6, 56/153, 182, 187; 460/59, 68, 70, 75, 77

(56) References Cited

U.S. PATENT DOCUMENTS

| | | | |
|---|---|---|---|
| 2,455,906 A | * | 12/1948 | Ronning et al. ............... 56/364 |
| 3,632,455 A | * | 1/1972 | Nakamura ................... 428/635 |
| 4,077,192 A | * | 3/1978 | Klinner et al. ............ 56/16.4 R |
| 4,209,024 A | * | 6/1980 | Powell et al. .................. 460/70 |
| 4,497,162 A | * | 2/1985 | Eguchi et al. ................ 56/14.6 |
| 4,548,213 A | * | 10/1985 | Phillips et al. ................ 460/90 |
| 4,610,127 A | * | 9/1986 | Eguchi et al. ................ 56/14.6 |
| 5,082,189 A | * | 1/1992 | Ernst et al. .................. 241/158 |

FOREIGN PATENT DOCUMENTS

| | | | |
|---|---|---|---|
| DE | 3727156 | 2/1989 | |
| EP | 230276 A1 | * 7/1987 | ........... A01F/12/44 |

* cited by examiner

Primary Examiner—Thomas B. Will
Assistant Examiner—Alicia Torres
(74) Attorney, Agent, or Firm—Husch & Eppenberger, LLC; Robert C. Haldiman

(57) ABSTRACT

A self-propelled forage harvester having a feed shaft through which the chopped material is delivered to a pair of conditioning rollers is disclosed. The width of the feed shaft converges on the way from the bladed drum to the pair of conditioning rollers. To direct the material out of the side regions towards the center evenly over the remaining width, there are provided drive-energy-free crop guide elements and are either in the form of plowshare-like guide elements or a contoured bottom. The chopped material mat in a crop discharge region is consistently thick.

11 Claims, 4 Drawing Sheets

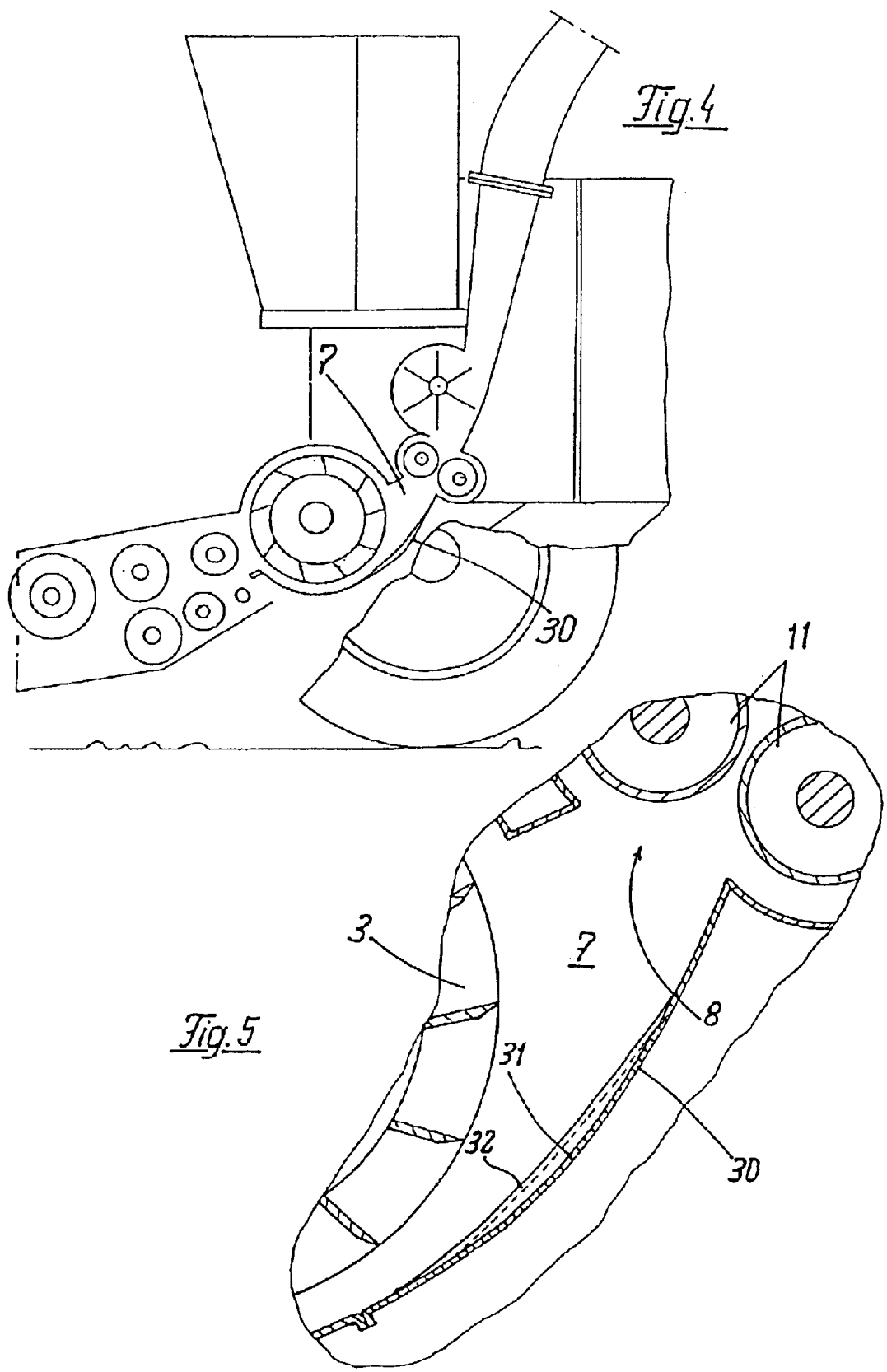

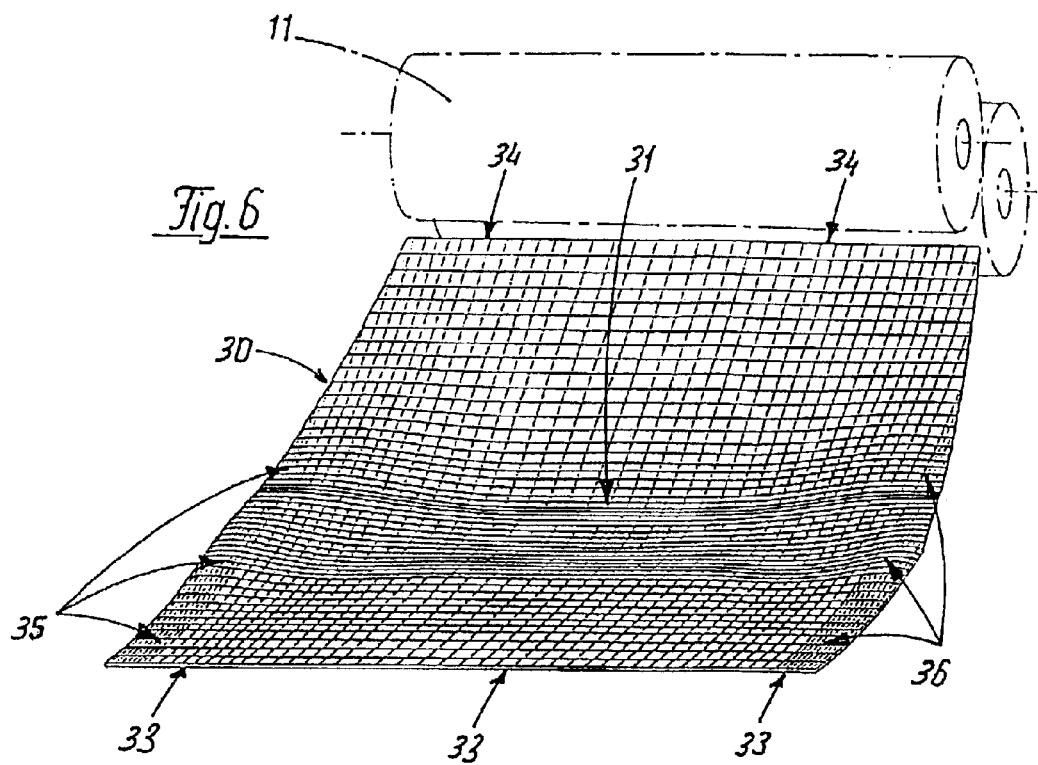
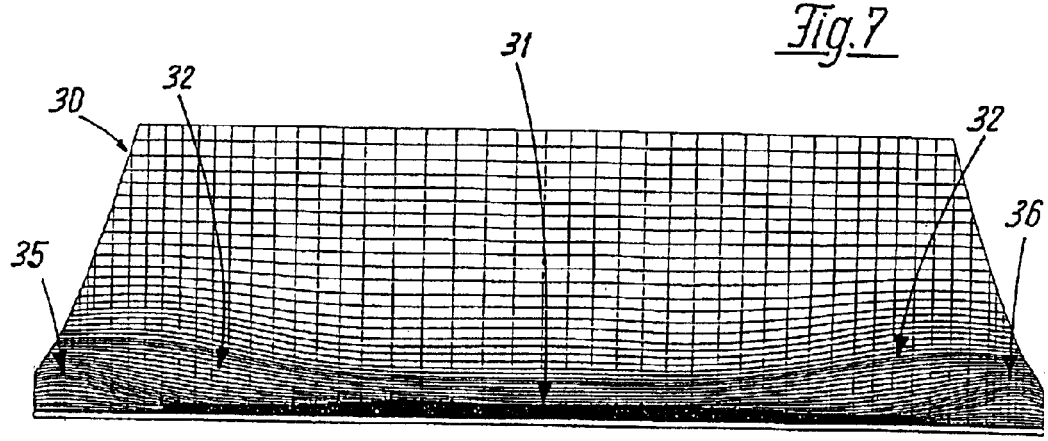

US 6,817,167 B2

FORAGE HARVESTER WITH TAPERED FEED TROUGH

BACKGROUND OF THE INVENTION

The present invention relates generally to agricultural machinery, especially self-propelled harvesting machines and, more particularly, to a harvesting machine having a tapered feed trough.

DE 3727156 A1 discloses a forage harvester having a rotating cylindrical main body whose end regions carry auger plates that feed harvested crop toward a central region comprising impeller blades. Due to this arrangement, the wide crop stream discharged by the chopper drum is fanned in to a narrow crop stream corresponding to the end of the tapered region of the feed shaft in such a way that the side regions of the narrow crop mat exhibit more crop mass than the central region. This crop stream is then discharged by a post-accelerator carrying feed paddles into a lower discharge chute and from the latter onto an accompanying vehicle.

A disadvantage of the forage harvester described above is that the device which fans the chopped material needs driving energy and it must be maintained. If instead of a post-accelerator, a pair of conditioning rollers is provided in the crop discharge region of the feed shaft a further aggravating disadvantage arises. The diminished chopped material mat entering the conditioning rollers is thicker in the side region than in the central region, which results in the bearings of the pair of conditioning rollers being subjected to high stress, and the action of the conditioning rollers on the chopped material being uneven.

SUMMARY OF THE INVENTION

It is therefore an aspect of the present invention to provide a forage harvester that operates in such a way that the chopped material mat in the crop discharge region is consistently thick and operates without the use of driving energy.

The aspect of the invention is achieved by the fact that associated with the feed shaft, which converges in the direction of transport, are static crop guide devices which allow transverse transport of the chopped material over the tapering width of the feed shaft.

The above aspects are merely illustrative and should not be construed as all-inclusive and limiting to the scope of the invention. The aspects and advantages of the present invention will become apparent, as it becomes better understood from the following detailed description when taken in conjunction with the accompanying drawings.

BRIEF DESCRIPTION OF THE DRAWINGS

Reference is now made to the drawings which illustrate the best presently known mode of carrying out the invention and wherein similar reference characters indicate the same parts throughout the views.

FIG. 4 is a side view of a second embodiment of the forage harvester;

FIG. 5 is a side view of the second embodiment of the forage harvester;

FIG. 6 is a perspective view of the second embodiment showing the feed shaft bottom contour; and FIG. 7 is a front view of the second embodiment showing the feed shaft bottom.

DETAILED DESCRIPTION

Figure 1:
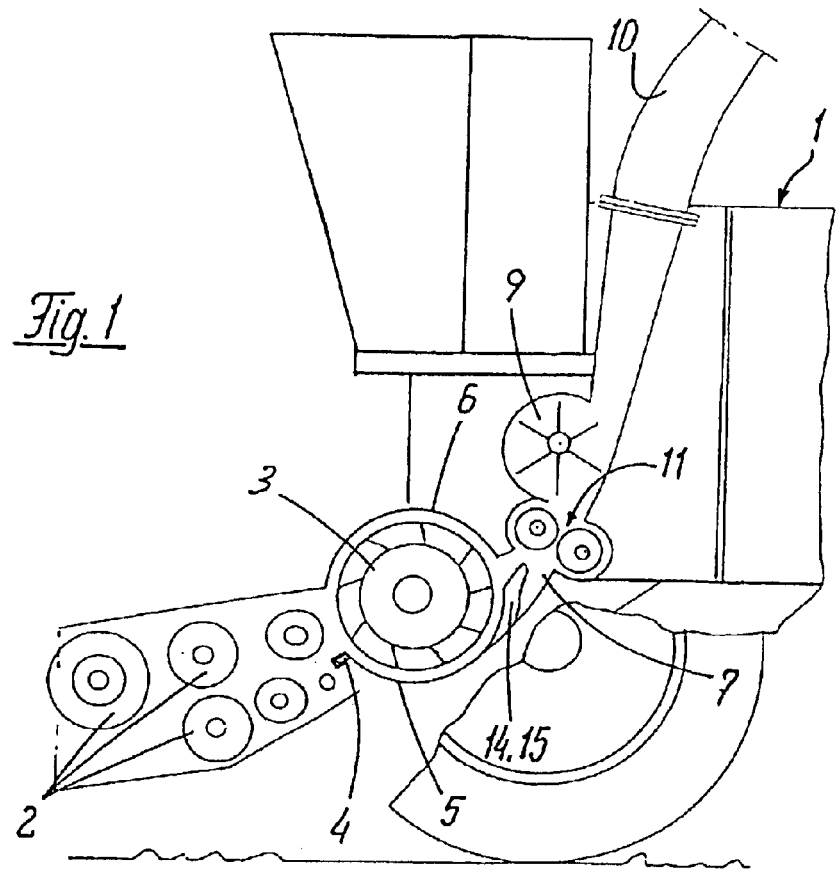
FIG. 1 is a side view of a self-propelled forage harvester.
Figure 3:
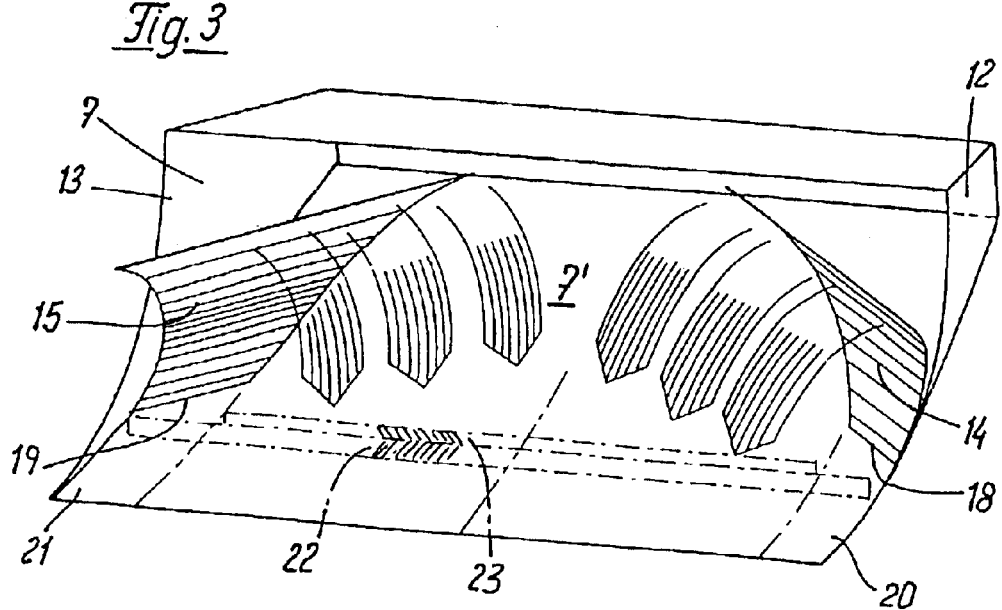
FIG. 3 is a perspective view of the feed shaft illustrating the direction of crop flow.
Figure 2:
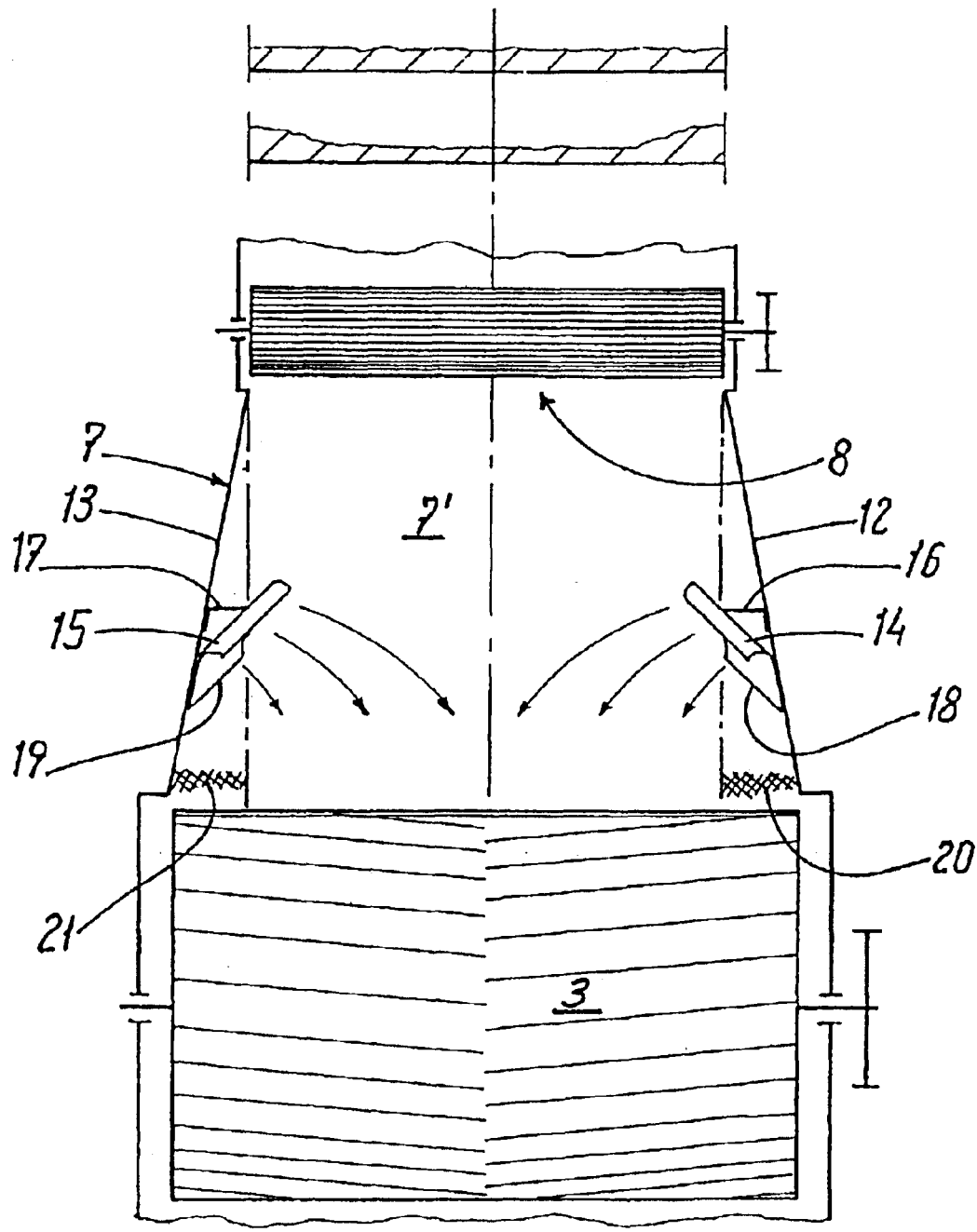
FIG. 2 is a sectional top view of the forage harvester shown in FIG. 1.

Referring initially to FIGS. 1–3, a forage harvester 1, having a front, tined receiving drum (not shown) with feed units 2 and a bladed chopper drum 3 is shown. A shear bar 4 is operatively attached to a drum bottom 5. The drum bottom 5 partially encases a lower portion of the bladed chopper drum 3. A housing 6, having the drum bottom 5 is operatively attached to a feed shaft 7. The feed shaft 7 has a feed shaft bottom 7'. The feed shaft 7 extends substantially the width of the bladed chopper drum 3 on the input side and converges to an outlet 8. The outlet 8 includes a post-accelerator 9 which throws the chopped material from a lower portion of a discharge chute 10 to a higher portion of the discharge chute 10 and, ultimately, to a transport vehicle. As shown in FIGS. 1, 2 and 4, a pair of conditioning rollers 11 is operatively mounted in front of the post-accelerator 9. The conditioning rollers 11 are drivably mounted at an end of the feed shaft 7.

In an advantageous manner, the devices which distribute the chopped material over the tapered width of the feed shaft 7 can be constructed as guide elements 14, 15 attached to obliquely converging side walls 12, 13 of the feed shaft 7. Due to this arrangement, the guide elements 14, 15 act together with the side walls 12, 13 on the crop stream mat. A central region of the crop stream mat which corresponds to the width of the discharge opening of the feed shaft 7 remains completely unaffected, however, so that no energy is consumed here. As FIGS. 2 and 3 show, the guide elements 14, 15 are rigidly connected by brackets 16, 17 to the converging side walls 12 and 13 of the feed shaft 7.

FIG. 3 shows the guide elements 14, 15 in the shape of plowshares. In this configuration, the guide elements 14, 15 evenly scrape off, turn and deposit on the side in distributed form the material picked up by them. This yields the advantage that the crop stream is not unevenly compressed, but laid in two layers one above the other over a narrower width.

The guide elements 14, 15 include scraping edges 18, 19, respectively. Two crop strips 20, 21 which project on both sides beyond the width of the narrow outlet 8 are scraped off the feed shaft bottom 7' by the scraping edges 18, 19 and, on account of the design of the guide elements 14, 15, are evenly discharged over the remaining central region. The crop mat which is then delivered to the outlet 8 is then composed of a lower original layer 22 and a second layer 23 arranged on top, wherein the quantity of material of the second layer 23 corresponds to the quantity of chopped material of the two lateral diverted crop strips 20, 21, best shown in FIGS. 2 and 3. The material being directed out of the edge regions is shown as arrows in FIG. 3.

The guide elements 14, 15 can be made of both steel and plastic. If plastic is used as the material for the guide elements 14, 15, they can be made by a single injection-molding operation. Also there is the possibility of selecting from a plurality of plastics to obtain the desired characteristics of a smooth surface and wear resistance. Naturally, it is also possible to make the guide elements 14, 15 of metal. Steel may be used, so that the guide elements 14, 15 are extremely stable and wear-resistant. If special demands are made on the guide elements 14, 15, the guide elements 14, 15 may also be made from composite material. For instance, several layers of different plastic material can be used. A combination of plastic and steel is also possible. Whatever material is used for the guide elements 14, 15, it is recommended that the surface which comes into contact with the chopped material be quenched and tempered and made to provide a low friction surface.

In alternative embodiments, the devices which distribute the chopped material evenly over the tapered width of the feed shaft 7 are not guide elements 14, 15 attached to the sidewalls 12, 13 of the feed shaft 7. Rather, a contoured bottom 30 of the feed shaft 7 forms the device, which evenly distributes the chopped material. It is advantageous to make the bottom 30 flat in the crop delivery region, trough-shaped in cross-section in the continuation of its course, and flat again in the crop discharge region. The chopped material mat is therefore tapered by the converging sidewalls and distributed by the contoured bottom 30 evenly displaced towards the center of the feed shaft and over the width of the tapered region. Satisfactory distribution and evening out are achieved by the direction of through flow, the flat bottom portion in the crop delivery region is shorter than the flat bottom portion in the crop discharge region. Distribution is further assisted by the central, trough-shaped region of the bottom 30 having plane side regions.

FIG. 4 is similar to FIG. 1 except the embodiment shown in FIG. 4 shows the forage harvester 1 with no guide elements 15, 16 in the region of the side walls. Instead, the embodiment of FIG. 4 shows that the bottom 30 of the feed shaft 7 is contoured. FIG. 5 shows a longitudinal section centrally through the feed shaft bottom 30, which reveals that a central region 31 of the feed shaft bottom 30 is arranged lower, compared with its two ascending side regions 32. FIGS. 6 and 7 show this clearly by grid hatching. According to FIGS. 6 and 7, an input region 33 of the feed shaft bottom 30 is flat. The central region 31 adjoining it is trough-shaped, wherein however its two edge regions 35, 36 are flat in the direction of transport of the material. In an output region 34, the feed shaft bottom 30 is tapered approximately to the width of the pair of conditioning rollers 11 and runs flat over its whole width. Due to the design of the feed shaft bottom 30, the stream of chopped material in cooperation with the converging side walls of the feed shaft 7 is fanned in evenly to the width of the conditioning rollers 11.

In both the embodiment shown in FIGS. 1 to 3 and in the embodiment shown in FIGS. 4 to 7, a chopped material mat of even thickness is delivered to the pair of conditioning rollers 11, so that on the one hand the load on the conditioning rollers 11 is even and the chopped material mat can be conditioned with the same quality over its whole width. A construction of a forage harvester 1 of this kind allows transverse transportation of the crop in the feed shaft 7 to even out the thickness of the crop mat and without the use of drive energy.

Other aspects, objects and advantages of the present invention can be obtained from a study of the drawings, the disclosure and the accompanying claims. The invention in its broader aspects is not limited to the specific steps and apparatus shown and described but departures may be made therefrom within the scope of the accompanying claims without departing from the principles of the invention and without sacrificing its chief advantages.

What is claimed is:

1. A forage harvester having feed units and a rotating chopper drum, comprising:
   a converging feed shaft adjoining the chopper drum and for receiving chopped material therefrom, said converging feed shaft being disposed to feed chopped material to at least one conditioning roller;
   a discharge chute at a crop discharge end of the feed shaft;
   a crop-transporting working member associated with the discharge chute ; and
   a plurality of static crop devices on the converging feed shaft, said static crop devices being disposed to transversely transport the chopped material from sides of the feed shaft generally evenly over a central portion of the feed shaft during harvesting.

2. The forage harvester according to claim 1, wherein the feed shaft includes converging side walls and the static crop guide devices are constructed as guide elements attached to the converging sidewalls of the feed shaft.

3. The forage harvester according to claim 2, wherein the guide elements are plowshares shaped.

4. The forage harvester according to claim 3, wherein the guide elements are made of plastic.

5. The forage harvester according to claim 3, wherein the guide elements are made of metal.

6. The forage harvester according to claim 3, wherein the guide elements are made of composite material.

7. The forage harvester according to claim 5, wherein the guide elements have a quenched and tempered, low-friction surface.

8. The forage harvester according to claim 1, wherein the static crop guide devices are formed by contouring a bottom of the feed shaft.

9. A forage harvester having feed units and a rotating chopper drum, comprising:
   a converging feed shaft adjoined to and for receiving chopped material from the chopper drum, the converging feed shaft having a lower discharge chute at its crop discharge end;
   at least one crop-transporting working member arranged behind the chopper drum;
   a plurality of static crop devices which allow transverse transport of the chopped material over the tapering width of the feed shaft, the static crop guide devices being formed by contouring a bottom of the feed shaft, wherein the bottom is substantially flat in a crop delivery region, trough-shaped in cross-section in a continuation of its course, and substantially flat again in a crop discharge region.

10. A forage harvester having feed units and a rotating chopper drum, comprising:
    a converging feed shaft adjoined to and for receiving chopped material from the chopper drum;
    the converging feed shaft having a lower discharge chute at its crop discharge end;
    at least one crop-transporting working member arranged behind the chopper drum;
    a plurality of static crop devices which allow transverse transport of the chopped material over the tapering width of the feed shaft, the static crop guide devices being formed by contouring a bottom of the feed shaft, wherein the bottom in a central trough-shaped region comprises substantially plane side regions.

11. The forage harvester according to claim 10, wherein the flat bottom portion in the crop delivery region is shorter, seen in the direction of crop through-flow, than the flat bottom portion in the crop discharge region.

* * * * *